United States Patent Office 3,578,582
Patented May 11, 1971

3,578,582
STARTUP PROCEDURE FOR CYCLIC REGEN-
ERATIVE PLATINUM-RHENIUM REFORMING
PROCESS
Robert L. Jacobson, Pinole, Calif., assignor to Chevron
Research Company, San Francisco, Calif.
No Drawing. Filed June 9, 1969, Ser. No. 831,773
Int. Cl. C10g *35/08*
U.S. Cl. 208—138           9 Claims

ABSTRACT OF THE DISCLOSURE

In a cyclic regenerative reforming process wherein a substantially sulfur-free naphtha fraction is contacted with a platinum group component-rhenium component catalyst at reforming conditions and in the presence of hydrogen to produce a high octane gasoline product, the process is started up by sulfiding the catalyst in situ with from 0.05 to 2 moles of sulfur per mole of the platinum group component and rhenium component, calculated as the metals.

BACKGROUND OF THE INVENTION

Field

The present invention relates to the startup of a reforming process using unsulfided platinum group component-rhenium component catalyst.

Prior art

The development of a platinum-rhenium catalyst for reforming was a significant breakthrough in the reforming art. Generally, the platinum-rhenium catalyst comprises from 0.01 to 3 weight percent platinum and from 0.01 to 5 weight percent phenium in association with a porous inorganic oxide support, for example, alumina. The catalyst has been shown to be extremely effective for the reforming of substantially sulfur-free naphtha fractions. In particular, the catalyst is significantly more stable in the production of $C_5+$ gasoline during reforming than a catalyst comprising platinum without rhenium. Furthermore, the fouling rate of the catalyst is lower than that of a catalyst comprising platinum without rhenium. The platinum-rhenium catalyst is described more fully in U.S. Pat. 3,415,737 which is incorporated herein by reference thereto. A substantially sulfur-free naphtha feed is defined as one containing less than about 10 p.p.m. sulfur as disclosed in said patent.

The platinum-rhenium catalyst, while shown to have especially high activity, yield stability and temperature stability, initially produces excessive methane during startup as a result of its high initial hydrocracking activity. The high hydrocracking activity could result in a temperature excursion or temperature runaway in a commercial reforming operation.

SUMMARY OF THE INVENTION

The present invention is concerned with startup of a regenerative reforming process using an unsulfided platinum group component-rhenium component catalyst. It has been found by the process of the present invention that the unsulfided platinum group component-rhenium component catalyst can be brought onstream in a cyclic regenerative process without excessive hydrocracking and without contaminating the system with sulfur. Thus the process of the present invention involves starting up a cyclic regenerative process having unsulfided catalyst in the reactor by contacting the catalyst with from 0.05 to 2 moles of sulfur per mole of platinum group component and rhenium component prior to contact of the naphtha fraction with the catalyst. The sulfiding is preferably conducted in the presence of hydrogen.

DESCRIPTION OF THE INVENTION

The process of the present invention is applicable to cyclic regenerative reforming systems. Thus the process of the present invention is concerned with reforming processes wherein the catalyst is regenerated at relatively short intervals of time, for example, after less than about 100 hours onstream time. In particular, the process of the present invention is concerned with reforming processes wherein a plurality of reactors are used in which at least one of the reactors is regenerated after less than 50 hours onstream time and preferably after less than 24 hours onstream time.

An unsulfided platinum group component-rhenium component catalyst has high initial cracking activity. Thus, excessive amounts of methane are produced during the early reforming period unless special precautions are taken to reduce the amount of cracking. After a period of use the hydrocracking activity of the platinum group component-rhenium component catalyst decreases to an acceptable low level. The process of the present invention is thus particularly concerned with the startup of fresh platinum group component-rhenium component catalyst which has not been presulfided and has not been used previously in a reforming process. A regenerated catalyst can also be started up by the present process.

Sulfiding of the platinum group component-rhenium component catalyst on startup has the advantage of curtailing the amount of methane which might otherwise be produced when the naphtha is contacted with the catalyst in the presence of hydrogen. Furthermore, decreasing the hydrocracking activity of the catalyst by sulfiding decreases the danger of a temperature excursion or heat front moving through the catalyst bed. However, the presence of sulfur is detrimental in that the yield stability and the activity characteristics of the catalyst are decreased.

It has also been found that the presence of sulfur during regeneration of the platinum group component-rhenium component catalyst is detrimental to the regeneration process. That is, when sulfur is present during the period of time in which the catalyst is contacted with an oxygen-containing gas at an elevated temperature to remove carbonaceous deposits and to increase the activity of the catalyst, the full activity and yield and temperature stability characteristics of the catalyst cannot be restored. The presence of sulfur during regeneration has been found to increase the size of the metal component particles, e.g., platinum and rhenium particles, which has the effect of hurting the activity and stability characteristics of the catalyst.

Thus, if too much sulfur is added during startup with the platinum group component-rhenium component catalyst, the sulfur will absorb onto the reactor internals, e.g., onto the iron walls of the reactor or the exit tubes or in the hydrogen recycle pipes, etc. When the catalyst is regenerated, the oxygen which is used in regeneration will oxidize the sulfur from the reactor internals and transport the oxidized sulfur to the catalyst. In non-regenerative systems or semiregenerative systems wherein long onstream periods of operation are possible before regeneration, e.g., 100 hours or more, sulfur is generally removed from the reactor system by the withdrawal of large volumes of produced hydrogen. In a cyclic regenerative system the onstream time between regenerations is not sufficiently long to permit the substantially complete removal of sulfur from the reactor system.

It has been found however, that if the level of sulfur used during startup with platinum group component-rhenium component catalyst in a cyclic regenerative process is maintained at from 0.05 to 2 moles of sulfur per mole of platinum group component and rhenium component, calculated as the metals, the benefit of sulfiding is obtained without significant detrimental aspects. Thus, the extremely small amount of sulfur which is used is not sufficient to create problems in the subsequent regeneration. Preferably only from 0.1 to 1 mole of sulfur per mole of platinum group component and rehenium component is used.

Starting up the reforming process can involve $H_2S$ or any of the sulfur compounds which convert to $H_2S$ at elevated temperatures and pressures and in the presence of hydrogen. Thus, for example, dimethyldisulfide can be used and in general is a preferred sulfur compound. Other sulfur compounds include light mercaptans.

Sulfur, that is, a compound of sulfur such as $H_2S$, is contacted with the catalyst prior to introduction of the feed. The present sulfiding technique is generally performed in the presence of hydrogen. Preferably the catalyst after being placed in the reactor is contacted with hydrogen at an elevated temperature for a period of time, e.g., at least 0.1 hour, and preferably 0.5 hour. Thereafter, while continuing the flow of hydrogen, an amount of sulfur of from 0.05 to 2 moles per mole of platinum group component and rhenium component on the catalyst is added. The flow of hydrogen is then continued for a period of time after the introduction of sulfur, e.g., at least 0.1 hour. The flow of hydrogen will remove any excess sulfur from the reaction zone; thereafter the feed can be introduced while continuing the flow of hydrogen.

When starting up a regenerated catalyst, it is particularly important that the catalyst be contacted in the presence of hydrogen for at least 0.1 hour and preferably 0.5 hour before introducing sulfur. Thus, the catalyst which has undergone a regeneration in the presence of an oxidizing atmosphere is hydrogen treated immediately prior to the introduction of sulfur and preferably the hydrogen treatment is continued after the introduction of sulfur.

The invention finds particular use when reforming with several reaction zones in series and naphtha feed is passed from one reaction zone to the other. Generally for low pressure cyclic reforming, the flow of feed to a reaction zone will be periodically discontinued and the catalyst in the reaction zone regenerated in the presence of an oxidizing atmosphere. After regeneration and reduction in the presence of hydrogen the reaction zone containing the regenerated catalyst is again brought in contact with naphtha feed. It is an advantage of the present invention after each reactor is brought offstream and the catalyst therein regenerated that the catalyst be sulfided with a small amount of sulfur prior to contact with the naphtha feed. This insures against the problem of a temperature runaway without the introduction of damaging amounts of sulfur.

The catalyst which finds use in the process of the present invention comprises from 0.01 to 3 weight percent of a platinum group component and from 0.01 to 5 weight percent of a rhenium component. Preferably the platinum group component is present in an amount of from 0.1 to 1 and preferably the rhenium component is present in an amount of from 0.1 to 2. The weight percents of the platinum group component and the rhenium component are calculated as the metals regardless of whether the components exist as the metal or compound form on the catalyst. The platinum group component embraces all the members of Group VIII of the Periodic Table having an atomic weight greater than 100 as well as compounds and mixtures of any of these. Thus, the platinum group components are the Group VIII noble metals or compounds thereof. Platinum is preferred because of its better performance during reforming.

Suitable porous inorganic oxide carriers or supports which find use in the present invention include a large number of materials on which the catalytically active amounts of the platinum group component and the rhenium component can be disposed. By "porous inorganic oxide" is meant any inorganic oxide during a surface area greater than 50 m.$^2$/gm. and preferably greater than 150 m.$^2$/gm.; preferably the porous inorganic oxide support has a surface area from 50 to 700 m.$^2$/gm. The support can be a naturally or a synthetically produced inorganic oxide or a combination of inorganic oxides. Typical porous inorganic oxide supports which can be used are the naturally occurring aluminosilicates, particularly when acid treated to increase the activity, synthetically produced cracking supports such as silica-alumina, silica-zirconia, silica-alumina-zirconia, silica-magnesia, silica-alumina-magnesia, and crystalline zeolitic aluminosilicates. Generally, however, for reforming processes it is preferred that the catalyst has low cracking activity, that is, has low acidity. Hence preferred catalysts are inorganic oxides such as alumina and magnesia.

A particularly preferred catalyst carrier is alumina. Any of the forms of alumina suitable as a support for reforming catalysts can be used. Furthermore, alumina can be prepared by a variety of methods for purposes of this invention. Thus, the alumina can be prepared by adding a suitable alkaline agent such as ammonium hydroxide to a salt of aluminum, such as aluminum chloride, aluminum nitrate, etc., in an amount to form aluminum hydroxide which on drying and calcining is converted to alumina. Alumina may also be prepared by the reaction of sodium aluminate with a suitable reagent to cause precipitation thereof with the resulting formation of aluminum hydroxide gel. Also, alumina may be prepared by the reaction of metallic aluminum with hydrochloric acid, acetic acid, etc., in order to form a hydrosol which can be gelled with a suitable precipitating agent, such as ammonium hydroxide, followed by drying and calcination.

The platinum group component and rhenium component can be associated with the porous inorganic oxide by various methods. The platinum group component and rhenium component can be disposed on the porous inorganic oxide in intimate admixture with each other by a suitable technique such as ion-exchange, coprecipitation, impregnation, etc. It is not necessary that the platinum group component and rhenium component be incorporated onto the porous inorganic oxide support by the same technique. One of the components can be associated with the porous inorganic oxide by one method, such as, for example, coprecipitation, and the other component associated with the porous inorganic oxide by another technique, such as, for example, impregnation. Furthermore, the components can be associated with the porous inorganic oxide by impregnation, either sequentially or simultaneously. In general the porous inorganic oxide is impregnated with an aqueous solution of a decomposable compound of platinum, etc., or rhenium, in sufficient concentration to provide the desired quantity of the platinum group component and rhenium component on the finished catalyst. To incorporate the preferred platinum group component, platinum, onto the porous inorganic oxide by impregnation, chloroplatinic acid is preferred. Other platinum group compounds are ammonium chloroplatinates, polyamine platinum salts, palladium chloride, etc. Rhenium is suitably incorporated onto the support by impregnation with perrhenic acid. Ammonium, or potassium perrhenates, among others can also be used.

The catalyst can be promoted for reforming by the addition of halides, particularly fluoride or chloride. Bromides may also be used. The halides apparently provide a limited amount of acidity to the catalyst which is beneficial to most reforming operations. A catalyst promoted with halide preferably contains from 0.1 to 3 weight percent total halide content. The halides can be incorporated onto the catalyst carrier at any suitable stage of catalyst manufacture, e.g., prior to or following incorporation of the platinum group component and rhenium component. Some halide is often incorporated onto the carrier by impregnating with the platinum group component; that is, for example, impregnation with chloroplatinic acid normally results in chloride addition to the carrier. Additional halide may also be incorporated onto the alumina if desired. In general, the halides are combined with the alumina by contacting suitable compounds such as hydrogen fluoride, ammonium fluoride, hydrogen chloride, or ammonium chloride, either in the gaseous form or in a water soluble form with the alumina. Preferably, the fluoride or chloride is incorporated onto the carrier from an aqueous solution containing the halide.

Reforming is generally conducted by contacting a light hydrocarbon oil, e.g., a naphtha fraction, boiling within the range of 70 to 550° F. and preferably from 150 to 450° F. with the platinum group component-rhenium component catalyst at a temperature in the range of from 600 to 1100° F., preferably 700 to 1050° F., and at a pressure of from atmospheric to superatmospheric, preferably from 25 to 1000 p.s.i.g. and more preferably from 50 to 750 p.s.i.g. As a more preferred embodiment of the present invention the reforming process is conducted at a pressure of less than 250 p.s.i.g. and preferably less than 200 p.s.i.g. The lower pressures are generally used with cyclic regenerative reforming processes. The actual reforming conditions depend in large measure on the feed used, whether highly aromatic, paraffinic or naphthenic, and upon the desired octane rating of the product. Furthermore the temperature and pressure can be correlated with the liquid hourly space velocity (LHSV) to favor any particularly desirable reforming reaction as, for example, aromatization, isomerization or dehydrogenation. In general, the liquid hourly space velocity will be from 0.1 to 10 and preferably from 1 to 5. The reforming process is conducted in the presence of hydrogen, either recycle hydrogen or fresh hydrogen, and generally the hydrogen rate will be from 0.5 to 20 moles of hydrogen per mole of feed.

The platinum group component-rhenium component catalyst is generally regenerated by contact with an oxygen-containing atmosphere, e.g., air, at an elevated temperature, e.g., at a temperature of around 700 to 1100° F. The oxygen-containing atmosphere generally contains less than 5 volume percent oxygen and preferably less than 2 volume percent oxygen. Alternately, the catalyst can be regenerated by contact with an oxygen-containing atmosphere at a partial pressure of from 0.1 to 2.5 p.s.i.a. and a temperature below 800° F. for a period of time to remove substantially all of the carbonaceous matter and then contacted with a regeneration gas containing oxygen at a partial pressure of from 1 to 2.5 p.s.i.a. and a temperature above 900° F. for a period of about at least 0.5 hour.

Halide may be added to the catalyst during the regeneration process in order to provide the regenerated catalyst with an increased halide content, e.g., of at least 0.6 weight percent.

The foregoing disclosure of this invention is not to be considered as limiting since many variations can be made by those skilled in the art without departing from the scope or spirit of the appended claims.

I claim:

1. In a regenerative reforming process wherein a substantially sulfur-free naphtha feed is contacted with a catalyst comprising 0.01 to 3 weight percent of a platinum group component and 0.01 to 5 weight percent of a rhenium component in association with a porous inorganic oxide carrier at reforming conditions and in the presence of hydrogen and wherein contact of the naphtha feed with the catalyst is periodically discontinued to permit regeneration of the catalyst after less than about 100 hours onstream time by contact at an elevated temperature with an oxidizing atmosphere to remove carbonaceous deposits from the catalyst and restore the activity of the catalyst, the improvement for starting up the process initially or after regeneration with the catalyst in the unsulfided state, said improvement comprising:

contacting the catalyst with hydrogen for at least 0.1 hour; then contacting the catalyst with hydrogen and from 0.05 to 2 moles of sulfur per mole of platinum group component and rhenium component on the catalyst; and then contacting the catalyst with hydrogen for at least 0.1 hour prior to introduction of the naphtha feed into contact with the catalyst.

2. A process as in claim 1 wherein the platinum group component comprises a platinum component.

3. The process of claim 1 wherein the porous inorganic oxide is alumina.

4. A process as in claim 1 wherein the sulfur is introduced as $H_2S$.

5. A process as in claim 1 wherein the sulfur is introduced as dimethyldisulfide.

6. A process as in claim 1 wherein the sulfur is present in an amount sufficient to provide from 0.1 to 1 mole of sulfur per mole of platinum group component and rhenium component.

7. A process as in claim 1 wherein the reforming conditions include a pressure from 50 to 250 p.s.i.g.

8. A process in accordance with claim 1 wherein the reforming conditions include a pressure less than 200 p.s.i.g.

9. A process in accordance with claim 1 wherein a plurality of reactors is used in which at least one of the reactors is regenerated after less than 50 hours onstream time.

References Cited

UNITED STATES PATENTS

| 2,952,611 | 9/1960 | Haxton et al. | 208—65 |
| 3,224,962 | 12/1965 | Baldwin | 208—138 |
| 3,434,960 | 3/1969 | Jacobson et al. | 208—138 |
| 3,438,888 | 4/1969 | Spurlock | 208—138 |

HERBERT LEVINE, Primary Examiner

U.S. Cl. X.R.

208—140